United States Patent
Diedrich et al.

(10) Patent No.: US 11,514,547 B2
(45) Date of Patent: *Nov. 29, 2022

(54) VISION SENSOR DYNAMIC WATERMARKING VIA NOISE CHARACTERIZATION

(71) Applicant: Ford Global Technologies, LLC, Dearborn, MI (US)

(72) Inventors: Jonathan Diedrich, Carleton, MI (US); Ali Hassani, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,961

(22) Filed: Jun. 28, 2021

(65) Prior Publication Data
US 2022/0164915 A1    May 26, 2022

Related U.S. Application Data

(63) Continuation of application No. 17/103,896, filed on Nov. 24, 2020, now Pat. No. 11,127,104.

(51) Int. Cl.
*G06T 1/00*     (2006.01)
*H04N 1/32*    (2006.01)

(52) U.S. Cl.
CPC .......... *G06T 1/005* (2013.01); *H04N 1/3232* (2013.01)

(58) Field of Classification Search
CPC .............................. G06T 1/005; H04N 1/3232
See application file for complete search history.

(56) References Cited

U.S. PATENT DOCUMENTS

2005/0114667 A1* 5/2005 Haas ...................... G06T 1/005
                                                                         713/176

* cited by examiner

*Primary Examiner* — Christopher Wait
(74) *Attorney, Agent, or Firm* — Frank Lollo; Eversheds Sutherland (US) LLP

(57) ABSTRACT

Vision sensor dynamic watermarking via noise characterization are disclosed herein. An example device can capture an image by a first device, where the image comprising a pixel group has baseline noise characterization caused by a base noise profile for the first device. The device can produce a noise watermark to create a watermarked image, where the noise watermark can be produced by altering the baseline noise characterization to produce modified noise characterization. The device can also transmit the watermarked image to a receiver.

20 Claims, 3 Drawing Sheets

VISION SENSOR DYNAMIC WATERMARKING VIA NOISE CHARACTERIZATION

CROSS-REFERENCE TO RELATED APPLICATIONS

The present application claims priority, the benefit of, and is a continuation application of U.S. application Ser. No. 17/103,896, filed Nov. 24, 2020, which is hereby incorporated by reference herein in its entirety.

BACKGROUND

Malicious tampering of vehicle camera systems can lead to deleterious effects. A faked camera feed can be utilized to spoof driver assistance and authentication systems, which directly compromise the system's reliability. A simple example would be to inject camera data with one that has a desired output, such as a data recording that includes a person walking in front of the vehicle. This simple spoof could endlessly trigger an automated emergency braking system and effectively render the vehicle un-drivable. An example method of detecting injection attacks is to apply a dynamic watermark to the image. Both the camera and receiver module would rely on a random pattern generator, which could apply a '0' pad to specific pixels, for identification of a valid camera source. However, this by definition has a direct tradeoff with image quality, as the more secure the watermark is, the more pixels are being modified. This can be combatted by sending the watermark profile as a secondary file attachment, but that by definition also has a consequence of doubling the communication bandwidth.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
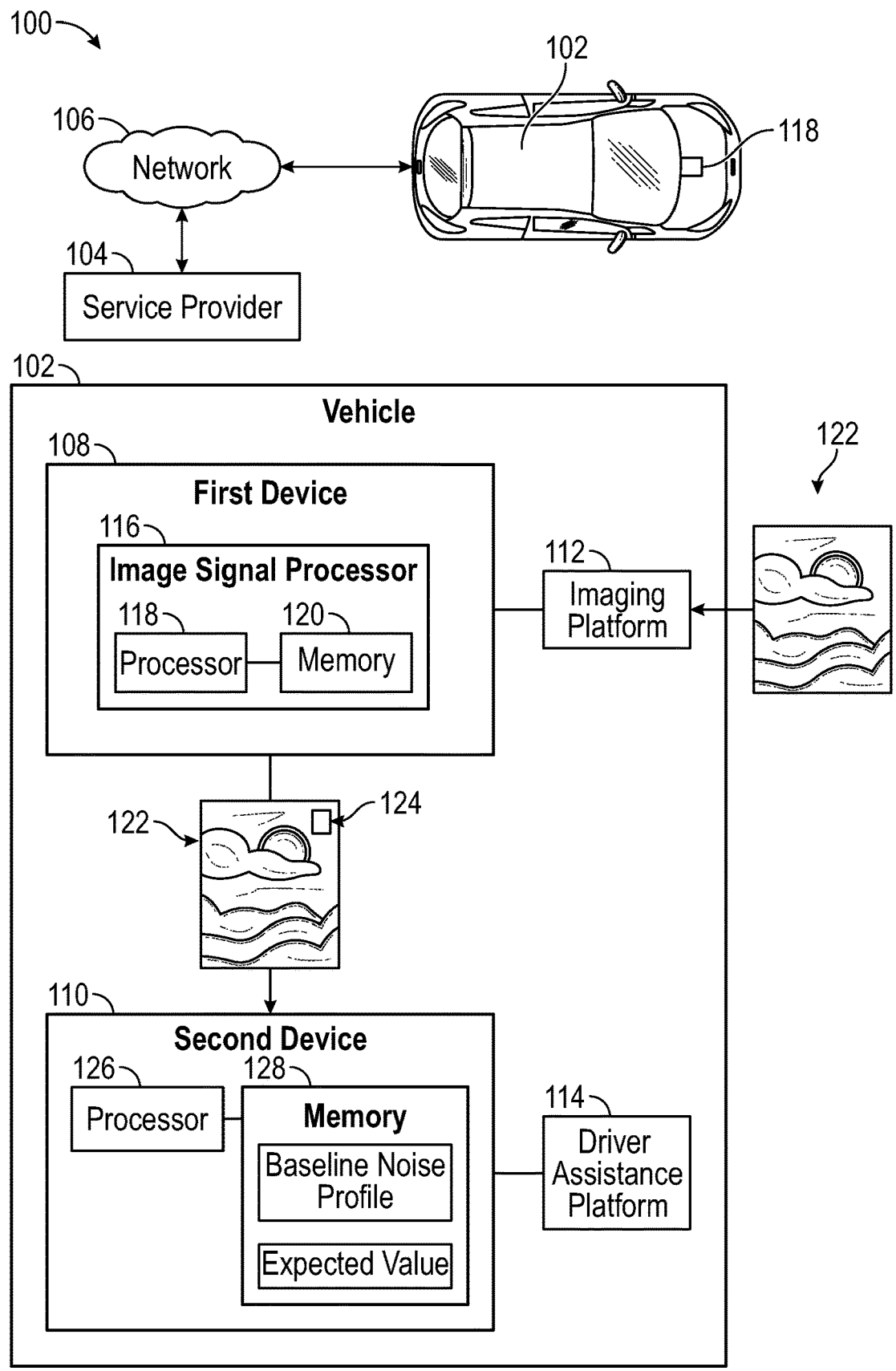
FIG. 1 depicts an illustrative architecture in which techniques and structures for providing the systems and methods disclosed herein may be implemented.

The present disclosure is generally directed to systems and methods that provide a light weight noise-based watermarking method that maintains the integrity of the image being transmitted. Camera noise characterization can be used to watermark the image based off a baseline noise profile deviation. Intrinsic noise characterizations for camera classification include Photo Response Non-Uniformity, lens aberration, interaction noise and temporal noise. These may be utilized to create a baseline noise characterization for comparison and watermark identification. While machine learning faking algorithms can become visually deceptive, the baseline noise characterization remains intrinsic to the imager; this is demonstrated in at least "Digital camera identification from sensor pattern noise" https://ieeexplore.ieee.org/abstract/document/1634362.

Generally, an imaging device, such as a camera, imputes baseline noise characterization to an image it captures due to camera components and configurations. This baseline noise characterization is imputed to each image captured by the camera. While the baseline noise characterization may change over time as camera performance changes over time, the baseline noise characterization is imputed to each image captured. Stated otherwise, each image captured by a particular camera may have a noise characterization that corresponds to the baseline noise characterization of the camera. This baseline noise characterization can be captured as a baseline noise profile.

To be sure, while examples provided herein may reference a camera, the present disclosure is not so limited. Thus, output from other similar imaging systems can be watermarked with noise in accordance with the present disclosure and processed as disclosed herein.

When the baseline noise characterization of a camera is known, the systems and methods herein can manipulate a pixel group of the picture by altering/modifying the noise characterization of the pixel group. Starting with the baseline noise characterization, the systems and methods can alter this baseline noise characterization to produce a modified noise characterization for these pixels. Modification of noise characterization from baseline creates a noise-based watermark. That is, the pixel group encodes a watermark that is based on noise alteration. In some instances, the alteration of the baseline noise characterization can include either filtering or amplification of the baseline noise characterization. When compared with the baseline noise characterization, the modified noise characterization produces a noise deviation that can be calculated, which is referred to generally as an expected value.

The watermarked image can be transmitted to a receiver. The receiver can validate or verify the watermarked image. In some instances, the receiver can receive both the baseline noise characterization and the expected value. The receiver can process the pixel group of the watermarked image, which results in the receiver determining the modified noise characterization for the pixel group. The receiver can evaluate both the modified noise characterization for the pixel group and the baseline noise characterization for the pixel group to determine a calculated noise deviation. When the calculated noise deviation and the expected value match, the image can be validated.

In some instances, this process can be made more robust by injecting a Zonal Expected Value (ZEV). As noted above, the baseline noise deviation can be periodically updated to compensate for changes in camera operation and behavior. In some instances, the update of the baseline noise deviation can include a secure challenge process where drift in baseline noise deviation can be verified using a private key. When the secure challenge process fails, the camera can be deactivated or information obtained therefrom can be disregarded.

Illustrative Embodiments

Turning now to the drawings, FIG. 1 depicts an illustrative architecture 100 in which techniques and structures of the present disclosure may be implemented. The architecture 100 can include a vehicle 102, a service provider 104, and a network 106. The network 106 may include any one or a combination of multiple different types of networks, such as cable networks, the Internet, cellular networks, wireless networks, and other private and/or public networks. In some instances, the network 106 may include cellular, Wi-Fi, or Wi-Fi direct. In other embodiments, components of the environment can communicate using short-range wireless protocols such as Bluetooth, near-field, infrared, and the like.

The vehicle 102 can generally include a first device 108, a second device 110 (e.g., receiver), an imaging platform 112, and a driver assistance platform 114. Generally, the first device 108 can include an image signal processor 116 that processes images obtained from the imaging platform 112. The imaging platform 112 can include one or more image capturing devices such as a camera, LIDAR, and an ultrasonic sensor—just to name few.

The image signal processor 116 can comprise a processor 118 and memory 120. The memory 120 stores instructions that can be executed by the processor 118 to perform any of the watermarking operations disclosed herein. The image signal processor 116 can be configured to communicate over the network 106 with any of the components of the architecture such as the service provider 104. The image signal processor 116 can incorporate or use any known communication device to transmit and/or receive data over the network 106. When referencing operations performed by the image signal processor 116, it will be understood that this includes the execution of instructions stored in the memory 120 by the processor 118.

Some embodiments disclose the image signal processor 116 as controlling or causing various components of the vehicle to be controlled. It will be understood that this can include direct control of a component by the image signal processor 116 or indirect control of the component through another vehicle controller, device, system, or assembly. In one non-limiting example, the image signal processor 116 could cooperate with the driver assistance platform 114 to control vehicle operations and behaviors such as the braking or throttling system(s).

Also, it will be understood that while methods disclosed herein as being executed at the vehicle level can also be executed at a service provider level. In some instances, methods can be cooperatively executed at both the vehicle level and the service provider level in combination.

The image signal processor 116 can be configured to watermark an image obtained from the imaging platform 112. When an image 122 is received, the image signal processor 116 can select a pixel group 124 from the image 122. The pixel group 124 can include any number of pixels, but in some instances, the pixel group 124 includes at least four pixels. The pixels in the pixel group 124 (as well as pixels across the image 122) have a baseline noise characterization caused by a baseline noise profile imputed by the imaging platform 112. That is, each image captured by the imaging platform 112 has baseline noise characterization that is imputed by the imaging platform 112. Thus, when a plurality of images captured by the imaging platform 112, each will have the same baseline noise characterization. Again, the baseline noise characterization is caused by the baseline noise profile of the imaging platform 112.

Information that is indicative of a watermark can be communicated using a seed value when the first device 108 and the second device 110 are paired with one another. The receiver 110 can periodically transmit a random value to XOR with the seed (or othewise modify seed) to generate a new or updated watermark pattern.

The image 122 can be watermarked by altering the baseline noise characterization for the pixel group 124. This alteration can produce a modified noise characterization for the pixelgroup 124. In one example, the alteration can include filtering the baseline noise characterization of the pixel group 124. In another example, the alteration can include amplifying the baseline noise characterization of the pixel group 124.

Generally, a noise deviation is created by the alteration. This noise deviation can also be referred to as an expected value. That is, the value difference calculated between the modified noise characterization and the baseline noise characterization is related to an expected value. In one example, a statistically significant filtering of the baseline noise characterization can be encoded as a watermark '0', with a statistically significant amplification of the baseline noise characterization can be encoded as a watermark '1'. The expected value may be understood to refer to a summation of data of local subzones of pixels in the image to average out a noise tampering score (e.g., modified noise characterization).

When the watermark has been applied to the pixel group 124 to produce a watermarked image, the image signal processor 116 can transmit the watermarked image to the second device 110. The second device 110 can include any device within the vehicle 102 used to check the validity or authenticity of the images obtained by the imaging platform 112. The second device 110 can comprise a processor 126 and memory 128. The memory 128 stores instructions that can be executed by the processor 126 to perform any of the watermarking operations disclosed herein. The second device 110 can be configured to communicate over the network 106 with any of the components of the architecture such as the service provider 104. The second device 110 can incorporate or use any vehicle communication device to transmit and/or receive data over the network 106. When referencing operations performed by the second device 110, it will be understood that this includes the execution of instructions stored in the memory 128 by the processor 126.

Also, the first device 108 and the second device 110 can communicate through any wired or wireless communication means. Initially, the first device 108 and the second device 110 can be paired at an event, such as a key-on event for the vehicle 102. The first device 108 can transmit the baseline profile for the imaging platform 112 to the second device 110. The second device 110 can also receive the noise deviation/expected value in some instances.

When a watermarked image is received by the second device 110, the second device 110 can determine the modified noise characterization for the pixel group. That is, the second device 110 can process the image to determine the watermark of the pixel group. When the watermark is detected, the second device 110 can be configured to determine a calculated noise deviation using the base noise profile and the modified noise characterization for the pixel group. For example, the second device 110 can calculate the modified noise characterization and subtract the values of the base noise profile. What remains from this calculation is the calculated noise deviation, which is a difference between the pixel group with the modified noise characterization and the pixel group with the baseline noise characterization (learned from the base noise profile). The second device 110 can determine that the image is valid when the calculated noise deviation matches the noise deviation/expected value previously stored.

Stated otherwise, the second device 110 can calculate the noise of the pixel group of the watermarked image and subtract the noise deviation/expected value that were encoded into the image. The calculated noise deviation is used to verify that the noise of the watermark matches the expected value. Should these values match, the image watermark is considered valid and vice versa. When the values do not match, the second device 110 can reject the image and flag the imaging platform 112 as potentially compromised.

In one example, enhancement to the watermark process disclosed above, the image signal processor 116 can apply a Zonal Expected Value (ZEV) to the noise characterization to add robustness. Additionally the challenge may employ down sampling to reduce run time resources. Feature extraction methods are theoretically possible to further reduce memory overhead.

In more detail, a zonal expected value refers to a process that involves dividing the images into subzones, and performing noise analysis on a local zone basis. For example, watermarking could be divided into a 4×4 grid, where the each zone in the grid has an expected watermark. A watermark correctness score would be calculated to each zone, where an expected value of the total image watermark correctness would then be computed.

This, in effect, acts as an averaging filter to mitigate the impacts of image losses (e.g. noise, compression, and so forth). Down sampling is a method to compress the image. It could be a merging of local pixels to strategically reduce resolution. In the case of down sampling, the noise template may first be extracted and then down sampled to the desired resolution to preserve the noise information better. This down sampled template would be then used to do the watermark encoding detection. Feature extraction would be a method of describing the noise profile by secondary characteristics (such as distribution metrics, such as mean, variance, skewness, kurtosis, and the like). These secondary characteristics allow for compacting the watermark detection model.

As noted above, the image signal processor 116 can be configured to periodically update its baseline noise profile. To be sure, camera photoreceptors may change over time due to usage and environmental conditions. Thus, the baseline noise profile can be periodically updated. This could occur at vehicle start by having a private key challenge to verify device identity, combined with validating noise profile deviation is nominal.

In one example, the second device 110 can store both the key and calculate profile drift. That is, prior to updating the baseline noise profile, the second device 110 can verify the key provided by the image signal processor 116. The second device 110 can receive the updated baseline noise profile from the image signal processor 116. The second device 110 can calculate a difference between the updated baseline noise profile and the baseline noise profile. When this difference is at or below a tolerance drift value, the baseline noise profile can be updated. For example, if the drift is an increase in noise that is no more than five percent, the baseline noise profile can be updated. The specific tolerance drift value selected can be based on any value and can be gathered from empirical data. If the key is valid but the noise profile has drifted too far, a notification may be presented to the user to see a dealer for camera verification—but the camera may still be functional for all features. If the key is invalid the camera may be no longer functional for any features, with a diagnostic trouble code and user notification provided for camera fault.

In general, the second device 110 can control various vehicle systems that rely on images. These vehicle systems can be communicatively coupled to the driver assistance platform 114. Thus, the second device 110 can relay signals to the driver assistance platform 114 that can be used to permit or deny vehicle operations as disclosed above.

Figure 2:
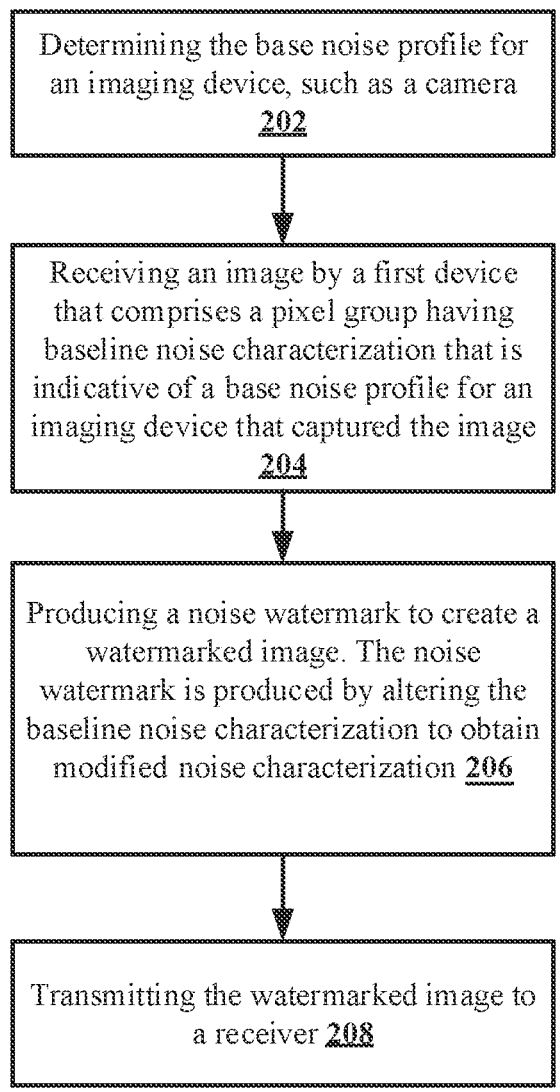
FIG. 2 is a flowchart of an example method for generating a noise watermarked image.

FIG. 2 is a flowchart of an example method that can be executed by an image signal processor of an example device. The method can include a step 202 of determining the base noise profile for an imaging device, such as a camera. The method can include a step 204 of receiving an image by a first device. The image comprises a pixel group having baseline noise characterization that is indicative of a base noise profile for an imaging device that captured the image. The method can include a step 206 of producing a noise watermark to create a watermarked image. The noise watermark is produced by altering the baseline noise characterization to produce modified noise characterization. The baseline noise characterization can be altered with an expected value. For example, the baseline noise characterization of the pixel group can be altered using a specific expected value that changes the baseline noise characterization to have the modified noise characterization. As noted above, altering the baseline noise characterization includes filtering the baseline noise characterization or amplifying the baseline noise characterization. Next, the method can include a step 208 of transmitting the watermarked image to a receiver. The receiver can also be provided with the base noise profile/baseline noise characterization, along with the expected noise value.

Figure 3:
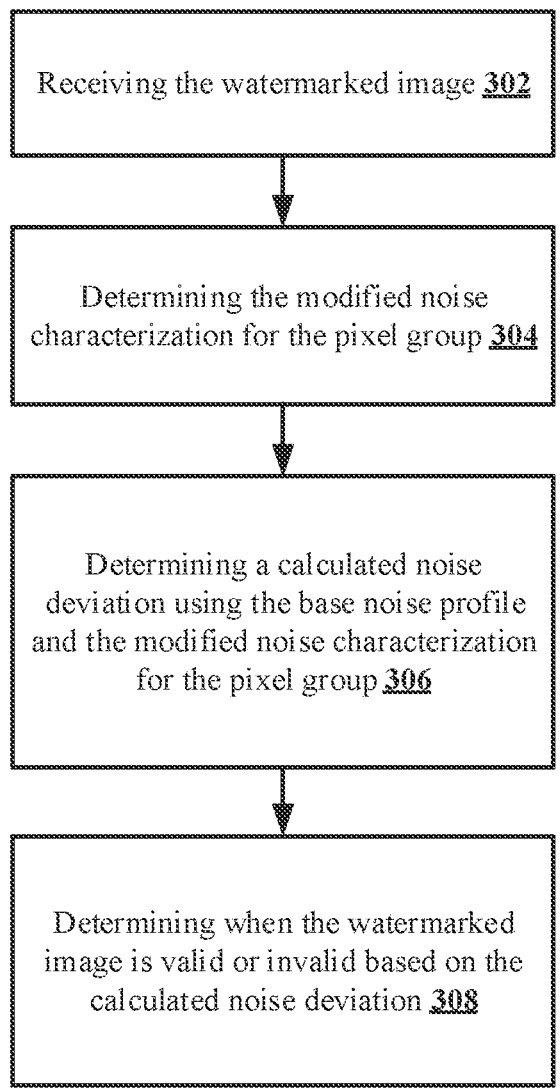
FIG. 3 is a flowchart of an example method for validating a noise watermarked image.

FIG. 3 is another example method of the present disclosure. The method can include a step 302 of receiving the watermarked image. The method also includes a step 304 of determining the modified noise characterization for the pixel group. In some instances, the method can include a step 306 of determining a calculated noise deviation using the base noise profile and the modified noise characterization for the pixel group. The calculated noise deviation can be determined by subtracting the modified noise characterization from the baseline noise characterization that is indicative of the base noise profile. The method can include a step 308 of determining when the watermarked image is valid or invalid based on the calculated noise deviation. When the calculated noise deviation matches the expected noise value for the watermarked image, the image is considered valid.

Figure 4:
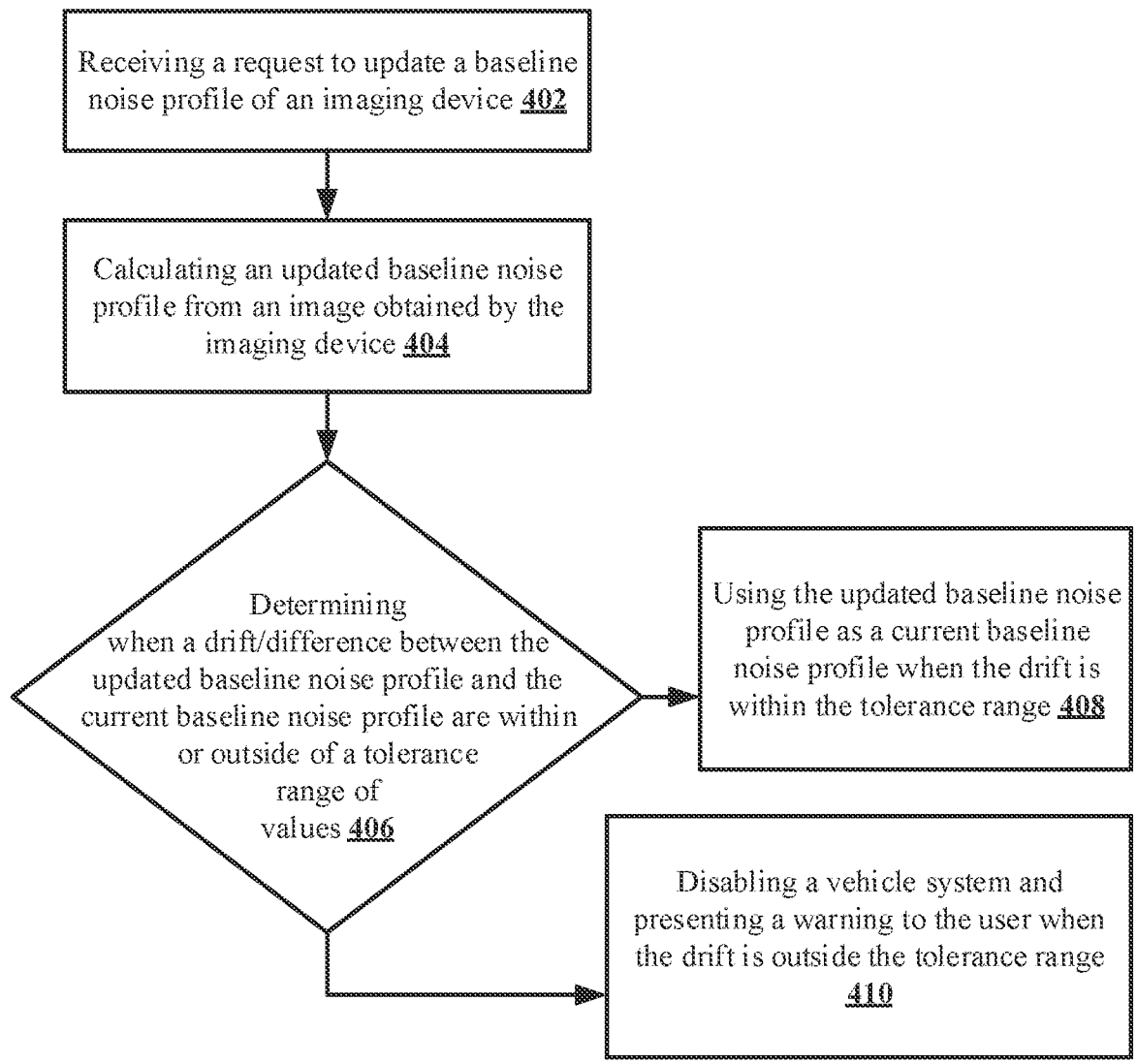
FIG. 4 is a flowchart of another method of the present disclosure.

FIG. 4 is an example method of the present disclosure related to updating a current baseline profile for an imaging device of a vehicle. The method can include a step 402 of receiving a request to update a baseline noise profile of an imaging device. The request can include transmitting of a key to a second device/receiver at a key on event for the vehicle (e.g., private key challenge). When the key is confirmed, the method can include a step 404 of calculating an updated baseline noise profile from an image obtained by the imaging device. If the key provided by the imaging device is invalid, the imaging device can be disabled.

The imaging device can transmit the updated baseline noise profile to the second device/receiver for evaluation. The method can include a step 406 of determining when a drift/difference between the updated baseline noise profile and the current baseline noise profile are within a tolerance range of values. The method can include as step 408 of using the updated baseline noise profile as a current baseline noise profile when the drift is within the tolerance range. When the drift is too large, the imaging device can be flagged for evaluation. Images from the imaging device can be ignored. That is, images from the imaging device may not be transmitted to a vehicle system that relies on such images. The method can include a step 410 of disabling a vehicle system and presenting a warning to the user when the drift is outside the tolerance range. For example, an automatic braking system that relies on images obtained by vehicle cameras may be disabled when the images obtained by the vehicle cameras cannot be validated.

In one example, the second device 110 can store both the key and calculate profile drift. That is, prior to updating the baseline noise profile, the second device 110 can verify the key provided by the image signal processor 116. The second device 110 can receive the updated baseline noise profile from the image signal processor 116. The second device 110 can calculate a difference between the updated baseline noise profile and the baseline noise profile. When this difference is at or below a tolerance drift value, the baseline noise profile can be updated. For example, if the drift is an increase in noise that is no more than 5%, the baseline noise profile can be updated. The specific tolerance drift value selected can be based on any value and can be gathered from empirical data. If the key is valid but the noise profile has drifted too far, a notification may be presented to the user to see a dealer for camera verification—but the camera may still be functional for all features. If the key is invalid the camera may be no longer functional for any features, with a diagnostic trouble code and user notification provided for camera fault.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characterization have been described, embodiments of the disclosure may relate to numerous other device characterizations. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
receiving an image by a first device, the image comprising a pixel group having baseline noise characterization that is indicative of a base noise profile for an imaging device that captured the image;
producing a noise watermark to create a watermarked image;
optimize the noise watermark using at least one optimization technique; and
transmitting the watermarked image to a receiver.

2. The method of claim 1, wherein the at least one optimization technique comprises a Zonal Expected Value (ZEV) technique, a down sampling technique, or a feature extraction method.

3. The method of claim 2, wherein the ZEV technique comprises:
dividing the watermarked image into subzones; and
performing noise analysis on each of the subzones.

4. The method of claim 3, wherein the ZEV technique comprises:
calculating a correctness value for each of the subzones; and
calculating a total value associated with a total image watermark correctness based on each subzone correctness value.

5. The method of claim 2, wherein the down sampling technique comprises:
extracting a noise template from the noise watermark;
down sampling the noise template to a desired resolution; and
utilizing the down sampled noise template to perform watermark encoding detection.

6. The method of claim 1, further comprising performing a periodic update to the base noise profile.

7. The method of claim 6, wherein the periodic update to the base noise profile comprising:
verifying an identity of the first device by using a private key;
receiving an updated base noise profile;
calculating a difference between the updated base noise profile and the base noise profile; and
comparing the difference to a tolerance drift value.

8. The method of claim 7, further comprising updating the base noise profile based on difference is below or equal to the tolerance drift.

9. The method of claim 7, further comprising:
determining the private key is valid;
determining the difference between the updated base noise profile and the base noise profile is greater than tolerance drift; and
displaying a notification to perform camera verification.

10. The method of claim 7, further comprising:
determining the private key is invalid; and
setting a camera that captured the image to be non-functional.

11. A device, comprising:
a processor; and
a memory for storing instructions, the processor executing the instructions to:
receive an image by a first device, the image comprising a pixel group having baseline noise characterization that is indicative of a base noise profile for an imaging device that captured the image;
produce a noise watermark to create a watermarked image;
optimize the noise watermark using at least one optimization technique; and
transmit the watermarked image to a receiver.

12. The device of claim 11, wherein the at least one optimization technique comprises a Zonal Expected Value (ZEV) technique, a down sampling technique, or a feature extraction method.

13. The device of claim 11, wherein the ZEV technique comprises further instructions to:
divide the watermarked image into subzones; and
perform noise analysis on each of the subzones.

14. The device of claim 13, wherein the ZEV technique comprises further instructions to:
calculate a correctness value for each of the subzones; and calculate a total value associated with a total image watermark correctness based on each subzone correctness value.

15. The device of claim 12, wherein the down sampling technique comprises further instructions to:
extract a noise template from the noise watermark;
down sample the noise template to a desired resolution; and
utilize the down sampled noise template to perform watermark encoding detection.

16. The device of claim 11, further comprising performing a periodic update to the base noise profile.

17. The device of claim 16, wherein the periodic update to the base noise profile comprising:
verify an identity of the first device by using a private key;
receive an updated base noise profile;
calculate a difference between the updated base noise profile and the base noise profile; and
compare the difference to a tolerance drift value.

18. The device of claim 17, further comprising updating the base noise profile based on difference is below or equal to the tolerance drift.

19. A system, comprising:
a first device comprising:
a processor; and
a memory for storing instructions, the processor executing the instructions to:
receive an image by a first device, the image comprising a pixel group having baseline noise characterization that is indicative of a base noise profile for an imaging device that captured the image;
produce a noise watermark to create a watermarked image;
optimize the noise watermark using at least one optimization technique; and
transmit the watermarked image to a receiver.

20. The system of claim 19, wherein the at least one optimization technique comprises a Zonal Expected Value (ZEV) technique, a down sampling technique, or a feature extraction method.

* * * * *